(12) United States Patent
Michioka

(10) Patent No.: US 7,059,988 B2
(45) Date of Patent: Jun. 13, 2006

(54) SERVO SYSTEM

(75) Inventor: Hirofumi Michioka, Kanagawa (JP)

(73) Assignee: JATCO Ltd, Fuji (JP)

( * ) Notice: Subject to any disclaimer, the term of this patent is extended or adjusted under 35 U.S.C. 154(b) by 144 days.

(21) Appl. No.: 10/882,171

(22) Filed: Jul. 2, 2004

(65) Prior Publication Data

US 2005/0037894 A1    Feb. 17, 2005

(30) Foreign Application Priority Data

Aug. 11, 2003    (JP)    ............... 2003-207051

(51) Int. Cl.
*F16H 31/00*    (2006.01)

(52) U.S. Cl. ..................................... 475/146
(58) Field of Classification Search ............... 192/87.1, 192/87.15, 87.16; 475/143, 146; 477/109
See application file for complete search history.

(56) References Cited

U.S. PATENT DOCUMENTS 5,029,685 A * 7/1991 Takase et al. ............ 192/48.91

FOREIGN PATENT DOCUMENTS

JP    2001-116060 A    4/2001

* cited by examiner

*Primary Examiner*—Dirk Wright
(74) *Attorney, Agent, or Firm*—Foley & Lardner LLP

(57) ABSTRACT

A servo system employs at least two multiple disk clutches arranged in series to each other in an axial direction and at least two pistons used for engagement and disengagement of the respective clutches and arranged to be nested each other so that one of the pistons fits inside the other. Also provided is a servo system control device with a piston-stroke order control section. The piston-stroke order control section determines a timing of operation of each of the pistons for engagement of the respective clutches so that the pistons are operated in a specified order that the outside piston is operated prior to the inside piston.

11 Claims, 11 Drawing Sheets

|  | C1 | C2 | C3 | B1 | B2 | B3 | B4 | F1 | F2 | F3 |
|---|---|---|---|---|---|---|---|---|---|---|
| 1st |  |  |  |  | ● | (○) | ○ |  | △ | △ |
| 2nd |  |  | ○ |  | (○) | (○) | ○ |  | △ | △ |
| 3rd |  | ○ | ○ |  | (○) |  | ● | c | △ |  |
| 4th | ○ | ○ | ○ |  |  |  | ● | c |  |  |
| 5th | ○ | ○ |  |  | ○ |  | ● | c | c |  |
| Rev |  | ○ |  | ○ | ○ |  |  | △ | △ |  |

IN PRESENCE OF THE PISTON STROKE OF 3RD BRAKE B3
AFTER THE PISTON STROKE OF 4TH BRAKE B4

IN PRESENCE OF THE PISTON STROKE OF 3RD BRAKE B3
BEFORE THE PISTON STROKE OF 4TH BRAKE B4

D RING DETACHED FROM THE OUTSIDE PISTON (4TH-BRAKE PISTON 8)
OWING TO THE PISTON STROKE OF 3RD-BRAKE PISTON 9
OCCURRING PRIOR TO THE PISTON STROKE OF 4TH-BRAKE PISTON 8

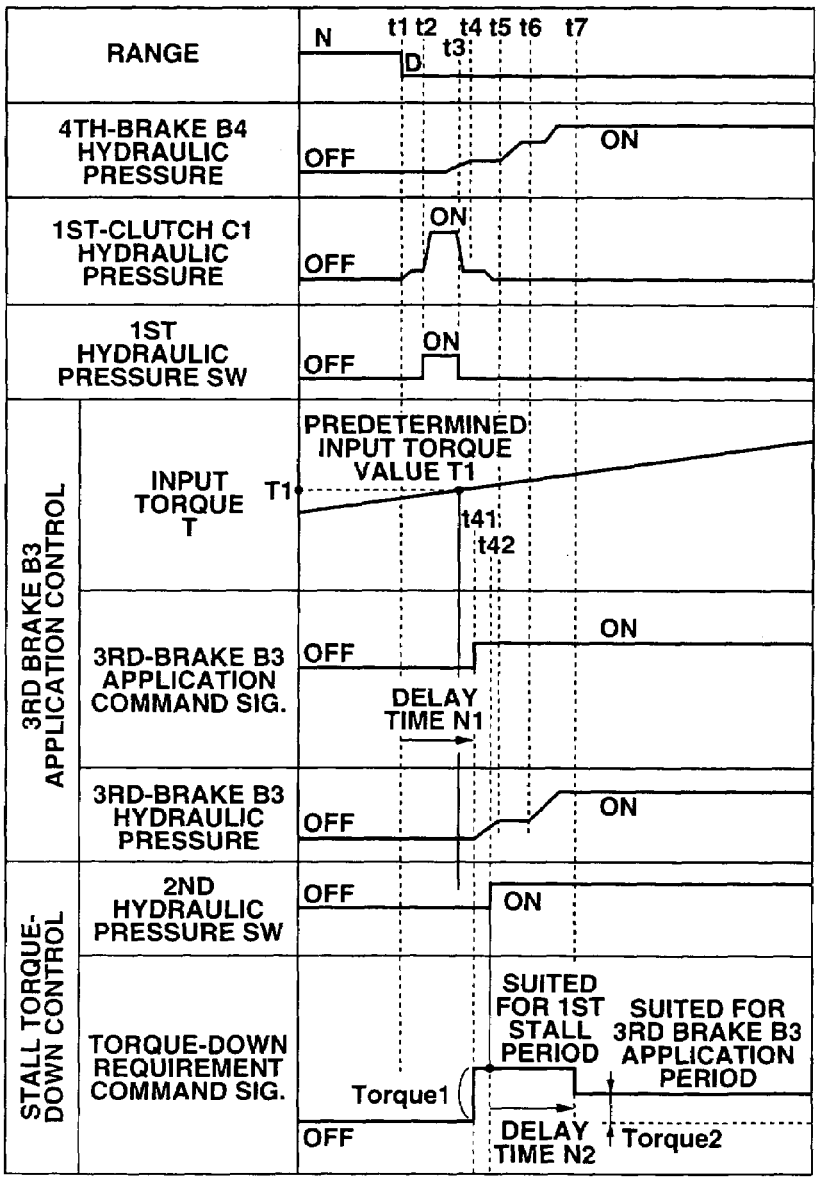

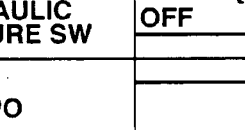

3RD-BRAKE B3 RELEASE CONTROL
DURING MODERATE ACC-PEDAL RELEASE TIME
(TERMINATED UNDER THE CONDITION T ≤ T2)

| FIG.10A | RANGE | D |
| FIG.10B | 4TH-BRAKE B4 HYDRAULIC PRESSURE | ON |
| FIG.10C | 1ST HYDRAULIC PRESSURE SW | OFF    t21   t22 t23   t24 |
| FIG.10D | APO | |
| FIG.10E | Ne | |
| FIG.10F | 3RD BRAKE B3 APPLICATION CONTROL — INPUT TORQUE T | T2 ⋯ PREDETERMINED INPUT TORQUE VALUE T2 (DETERMINED BASED ON TURBINE SPEED Nt) |
| FIG.10G | 3RD-BRAKE B3 HYDRAULIC PRESSURE | ON — DELAY TIME N3 — OFF |
| FIG.10H | 2ND HYDRAULIC PRESSURE SW | ON — OFF |
| FIG.10I | STALL TORQUE-DOWN CONTROL — TORQUE-DOWN REQUIREMENT COMMAND SIG. | SUITED FOR 3RD BRAKE B3 APPLICATION PERIOD (Torque2) / SUITED FOR 1ST STALL PERIOD (Torque1) |

3RD-BRAKE B3 RELEASE CONTROL
DURING QUICK ACC-PEDAL RELEASE TIME
(TERMINATED UNDER THE CONDITION ΔAPO ≥ ΔAPOn)

| | | |
|---|---|---|
| FIG.11A | RANGE | D |
| FIG.11B | 4TH-BRAKE B4 HYDRAULIC PRESSURE | ON |
| FIG.11C | 1ST HYDRAULIC PRESSURE SW | OFF    t31    t32 |
| FIG.11D | APO | |
| FIG.11E | Ne | |
| FIG.11F | 3RD BRAKE B3 APPLICATION CONTROL — ΔAPO | ΔAPOn    PREDETERMINED THRESHOLD VALUE ΔAPOn DETERMINED BASED ON INITIAL OPENING |
| FIG.11G | 3RD-BRAKE B3 HYDRAULIC PRESSURE | ON    OFF |
| FIG.11H | 2ND HYDRAULIC PRESSURE SW | ON    OFF |
| FIG.11I | STALL TORQUE-DOWN CONTROL — TORQUE-DOWN REQUIREMENT COMMAND SIG. | SUITED FOR 3RD BRAKE B3 APPLICATION PERIOD    SUITED FOR 1ST STALL PERIOD    Torque1    ↑Torque2 |

3RD-BRAKE B3 APPLICATION CONTROL IN D RANGE
(INITIATED UNDER THE CONDITION T ≥ T1)

| | | | |
|---|---|---|---|
| FIG.13A | RANGE | D | t31 t32 t33 |
| FIG.13B | 4TH-BRAKE B4 HYDRAULIC PRESSURE | ON | |
| FIG.13C | 1ST HYDRAULIC PRESSURE SW | ON (B3 APPLICATION DISABLED) | OFF (B3 APPLICATION ENABLED) |
| FIG.13D | 3RD BRAKE B3 APPLICATION CONTROL — INPUT TORQUE T | T1 ⟶ (rising line) | |
| FIG.13F | 3RD-BRAKE B3 HYDRAULIC PRESSURE | OFF | DELAY TIME N4 → ON |
| FIG.13E | STALL TORQUE-DOWN CONTROL — 2ND HYDRAULIC PRESSURE SW | OFF | ON |
| FIG.13G | TORQUE-DOWN REQUIREMENT COMMAND SIG. | OFF | SUITED FOR 1ST STALL PERIOD / DELAY TIME N2 |

SUITED FOR 3RD BRAKE B3 APPLICATION PERIOD

SERVO SYSTEM

TECHNICAL FIELD

The present invention relates to an automotive automatic-transmission servo system that transmits input torque, and specifically to the improvement of operational control for system actuation of a servo system employing at least two multiple disk clutches arranged in series to each other in the axial direction and at least two axially movable pistons used for engagement and disengagement of the respective clutches and arranged to be nested each other in the radial direction so that one of the pistons fits inside the other.

BACKGROUND ART

One such servo system, employing a plurality of multiple disk clutches axially arranged in series to each other and a plurality of pistons arranged to be nested each other in the radial direction, has been disclosed in Japanese Patent Provisional Publication No. 2001-116060 (hereinafter is referred to as "JP2001-116060"). In the servo system disclosed in JP2001-116060, a fourth brake, serving as a start frictional-engagement element, and a third brake, serving as an engine braking means, are arranged in series to each other in the axial direction. A third-brake piston, used to engage and disengage the third brake, and a fourth-brake piston, used to engage and disengage the fourth brake, are arranged to be nested each other in the radial direction, so that the third-brake piston (the inside piston) axially slidably fits onto the inner periphery of the fourth-brake piston (the outside piston) to permit relative sliding motion of one of the pistons to the other.

SUMMARY OF THE INVENTION

In the servo system as disclosed in JP2001-116060, during starting, generally, a so-called "torque-down control" is executed to properly suppress the magnitude of input torque transferred from the engine to the servo system of the automatic transmission. The degree of input-torque suppression, that is, the required torque-down amount, is determined depending on the apply torque capacity of the fourth brake. During the starting period, in order to provide easier starting or to enhance the vehicle's starting performance, the third brake, arranged in series to the fourth brake, is engaged almost simultaneously with application of the fourth brake. Suppose that the required torque-down amount, in other words, the controlled variable of torque-down control, is set to a small value, taking into account good starting performance. In such a case, there are the following drawbacks.

Assuming that the third brake having the inside piston (the third-brake piston) is applied prior to application of the fourth brake having the outside piston (the fourth-brake piston), the final piston-stroke amount of the third-brake piston (the inside piston) becomes the summed stroke of the piston stroke required to apply the fourth brake and the piston stroke required to apply the third brake. Owing to the undesirably increased piston stroke (the summed stroke) of the third-brake piston (the inside piston), there is a possibility that the D-shaped ring (simply, D ring) of the third-brake piston (the inside piston) is brought out of sliding-fit with the inner periphery of the fourth-brake piston (the outside piston) and thus the inside piston becomes undesirably detached from the outside piston. To avoid this, the axial length of the outside piston has to be lengthened. This leads to the problem of increased entire axial size of the servo system.

Accordingly, it is an object of the invention to provide a servo system employing at least two frictional-engagement element actuating pistons axially slidably fitting to each other, capable of certainly preventing one of the pistons from being undesirably detached from the other without increasing the entire axial size of the servo system.

In order to accomplish the aforementioned and other objects of the present invention, a servo system employing at least two multiple disk clutches arranged in series to each other in an axial direction and at least two pistons used for engagement and disengagement of the respective clutches and arranged to be nested each other so that one of the pistons fits inside the other, comprises a servo system control device comprising a piston-stroke order control section that determines a timing of operation of each of the pistons for engagement of the respective clutches so that the pistons are operated in a specified order that the outside piston is operated prior to the inside piston.

According to another aspect of the invention, a servo system employing at least two multiple disk clutches arranged in series to each other in an axial direction and at least two pistons used for engagement and disengagement of the respective clutches and arranged to be nested each other so that one of the pistons fits inside the other, comprises a servo system control device comprising piston-stroke order control means for determining a timing of operation of each of the pistons for engagement of the respective clutches so that the pistons are operated in a specified order that the outside piston is operated prior to the inside piston.

According to a further aspect of the invention, a method of controlling a servo system employing at least two multiple disk clutches arranged in series to each other in an axial direction and at least two pistons used for engagement and disengagement of the respective clutches and arranged to be nested each other so that one of the pistons fits inside the other, one of the clutches associated with the outside piston and serving as a start frictional-engagement element, and the other clutch associated with the inside piston and serving as an engine braking means during a vehicle's coasting state, the method comprises determining whether a current operating mode is a neutral-to-drive range selection control mode, determining whether a first hydraulic pressure switch, which detects an apply pressure of a first clutch, becomes turned OFF during the neutral-to-drive range selection mode, initiating application of the one clutch with a stroke of the outside piston in one axial direction from a time when the first hydraulic pressure switch becomes turned OFF during the neutral-to-drive range selection mode, determining whether a magnitude of input torque transmitted to the servo system is greater than or equal to a predetermined torque value, determining whether a predetermined delay time has elapsed from a point of time of the neutral-to-drive range selection, under a condition where the first hydraulic pressure switch becomes turned OFF during the neutral-to-drive range selection mode and additionally the magnitude of input torque is greater than or equal to the predetermined torque value, so as to determine a timing of initiation of a stroke of the inside piston in the one axial direction after the stroke of the outside piston in the one axial direction, outputting a command signal for application of the other clutch with the stroke of the inside piston in the one axial direction and simultaneously outputting a first torque-down requirement command to limit an upper limit of the input torque, from a point of time when the predetermined delay time has elapsed from the point of time of the neutral-to-drive range selection, determining whether a second hydraulic pressure switch, which detects an apply pressure of the second clutch, becomes turned ON, after outputs of the command signal for application of the other clutch with the stroke of the inside piston in the one axial direction and the first torque-down requirement command, determining whether a predetermined delay time has elapsed from a time when the second hydraulic pressure switch becomes turned ON, and switching a torque-down requirement command from the first torque-down requirement command to a second torque-down requirement command less than the first torque-down requirement command when the predetermined delay time has elapsed from the time when the second hydraulic pressure switch becomes turned ON. Preferably, the method may further comprise determining whether a time rate of change of an accelerator pedal's manipulated variable in an accelerator pedal release direction is greater than or equal to a predetermined threshold value, determining whether the magnitude of the input torque is less than or equal to a predetermined torque value, determining whether a predetermined delay time has elapsed from a time when the magnitude of the input torque becomes less than or equal to the predetermined torque value, switching the torque-down requirement command from the second torque-down requirement command to the first torque-down requirement command, when the time rate of change of the accelerator pedal's manipulated variable is greater than or equal to the predetermined threshold value, switching the torque-down requirement command from the second torque-down requirement command to the first torque-down requirement command, when the magnitude of the input torque is less than or equal to the predetermined torque value and the predetermined delay time has elapsed from the time when the magnitude of the input torque becomes less than or equal to the predetermined torque value, and outputting a command signal for release of the other clutch with the stroke of the inside piston in the opposite axial direction, from a point of time when the predetermined delay time has elapsed from the time when the magnitude of the input torque becomes less than or equal to the predetermined torque value.

According to another aspect of the invention, a method of controlling a servo system employing at least two multiple disk clutches arranged in series to each other in an axial direction and at least two pistons used for engagement and disengagement of the respective clutches and arranged to be nested each other so that one of the pistons fits inside the other, one of the clutches associated with the outside piston and serving as a start frictional-engagement element, and the other clutch associated with the inside piston and serving as an engine braking means during a vehicle's coasting state, the method comprises determining whether a drive range is selected, determining whether a first hydraulic pressure switch, which detects an apply pressure of a first clutch, becomes turned OFF in the drive range, initiating application of the one clutch with a stroke of the outside piston in one axial direction from a time when the first hydraulic pressure switch becomes turned OFF in the drive range, determining whether a magnitude of input torque transmitted to the servo system is greater than or equal to a predetermined torque value, determining whether a predetermined delay time has elapsed from a time when the magnitude of the input torque transmitted to the servo system becomes greater than or equal to the predetermined torque value, under a condition where the first hydraulic pressure switch becomes turned OFF in the drive range, so as to determine a timing of initiation of a stroke of the inside piston in the one axial direction after the stroke of the outside piston in the one axial direction, outputting a command signal for application of the other clutch with the stroke of the inside piston in the one axial direction and outputting a first torque-down requirement command suited for a first gear range stall period to limit an upper limit of the input torque, from a point of time when the predetermined delay time has elapsed from the time when the magnitude of the input torque becomes greater than or equal to the predetermined torque value, determining whether a second hydraulic pressure switch, which detects an apply pressure of the other clutch, becomes turned ON, after outputs of the command signal for application of the other clutch with the stroke of the inside piston in the one axial direction and the first torque-down requirement command, determining whether a predetermined delay time has elapsed from a time when the second hydraulic pressure switch becomes turned ON, and switching a torque-down requirement command from the first torque-down requirement command to a second torque-down requirement command less than the first torque-down requirement command when the predetermined delay time has elapsed from the time when the second hydraulic pressure switch becomes turned ON.

The other objects and features of this invention will become understood from the following description with reference to the accompanying drawings.

BRIEF DESCRIPTION OF THE DRAWINGS

FIGS. 9A–9I are time charts showing the control action executed by the system of the embodiment, obtained during quick apply of third brake B3 just after N→D selection (neutral-to-drive range selection).

FIGS. 10A–10I are time charts showing the control action executed by the system of the embodiment, obtained in case that the magnitude of input torque is used as a control parameter for the third-brake release.

FIGS. 11A–11I are time charts showing the control action executed by the system of the embodiment, obtained in case that an accelerator opening is used as a control parameter for the third-brake release.

FIGS. 13A–13G are time charts related to the modified countermeasure control routine of FIG. 12, and showing the control action executed by the system of the embodiment, obtained in case that the magnitude of input torque is used as a control parameter for the third-brake apply.

DESCRIPTION OF THE PREFERRED EMBODIMENTS

Figures 1, 2:
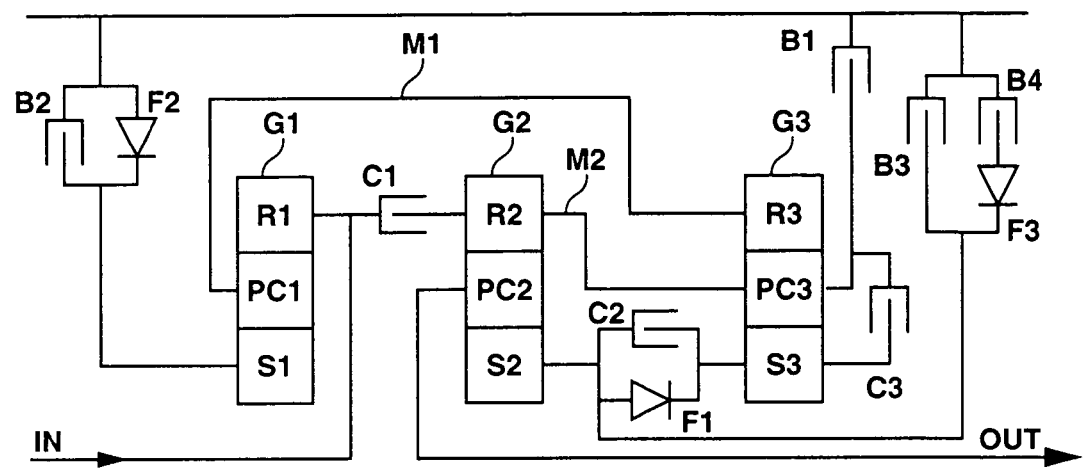
FIG. 1 is a skeleton diagram illustrating the general arrangement of an automatic transmission with a plurality of frictional-engagement element actuating pistons axially slidably fitting to each other.
FIG. 2 is a logic table for internal conditions, such as clutch engagement/disengagement, brake apply/release, and the like, in the automatic transmission for all transmission operating conditions.

Referring now to the drawings, particularly to FIG. 1, the servo system of the embodiment is exemplified in an electronically controlled automatic transmission (ECT) capable of performing transmission ratio control and engine control in conjunction with an electronic engine control unit, often abbreviated to "ECU" (described later).

As shown in FIG. 1, the gear train (power train) of the automatic transmission mainly includes a first planetary gearset G1, a second planetary gearset G2, and a third planetary gearset G3. 1st planetary gearset G1 is comprised of a single-planet-pinion carrier equipped planetary gearset, which consists of a first sun gear S1, a first ring gear R1, first planet pinions (not shown) being in meshed engagement with first sun gear S1 and first ring gear R1, and a first single-planet-pinion carrier PC1 in which the first pinions are rotatably held. 2nd planetary gearset G2 is also comprised of a single-planet-pinion carrier equipped planetary gearset, which consists of a second sun gear S2, a second ring gear R2, second planet pinions (not shown) being in meshed engagement with second sun gear S2 and second ring gear R2, and a second single-planet-pinion carrier PC2 in which the second pinions are rotatably held. 3rd planetary gearset G3 is also comprised of a single-planet-pinion carrier equipped planetary gearset, which consists of a third sun gear S3, a third ring gear R3, third planet pinions (not shown) being in meshed engagement with third sun gear S3 and third ring gear R3, and a third single-planet-pinion carrier PC3 in which the third pinions are rotatably held. Provided is a first connecting member M1 through which first single-planet-pinion carrier PC1 and third ring gear R3 are integrally connected or coupled to each other. Also provided is a second connecting member M2 through which second ring gear R2 and third single-planet-pinion carrier PC3 are integrally connected or coupled to each other. A first clutch C1 is provided to selectively connect or disconnect first ring gear R1 to or from second ring gear R2. A second clutch C2 is provided to selectively connect or disconnect second sun gear S2 to or from third sun gear S3. A one-way clutch F1 is provided in parallel with second clutch C2. On the other hand, third single-planet-pinion carrier PC3 and third sun gear S3 can be properly connected to each other or selectively restricted by means of a third clutch C3. A first brake B1 is provided to selectively stop rotary motion of second connecting member M2. In other words, second connecting member M2 is locked up and held stationary by way of application of first brake B1. A second brake B2 is provided to selectively stop rotary motion of first sun gear S1. In other words, first sun gear S1 is locked up and held stationary by way of application of second brake B2. A second one-way clutch F2 is provided in parallel with second brake B2. A third brake B3 is provided to selectively stop rotary motion of second sun gear S2, such that second sun gear S2 is locked up and held stationary by way of application of third brake B3. During normal ratio control, third brake B3 is applied when engine braking is required during a coast engine-braking operating mode. In the power transmission path, a fourth brake B4 and a third one-way clutch F3, both in series to each other, are further provided in parallel with third brake B3. A transmission input shaft IN of the automatic transmission is connected to first ring gear R1, so that torque (engine power output) is transmitted from the engine (the driving power source) via a torque converter (not shown) to the gear train of the ECT. On the other hand, a transmission output shaft OUT is connected to second single-planet-pinion carrier PC2, so that the driving torque is transmitted through a propeller shaft (not shown) and a final drive and differential unit (not shown) via axle driveshafts (not shown) to drive wheels (not shown). As will be described later in reference to FIG. 5, the clutch- and brake-application logic for hydraulically-operated frictional-engagement elements, simply hydraulically-operated friction elements (C1, C2, C3, B1, B2, B3, B4, F1, F2, and F3) shown in FIG. 2 is realized by means of a control valve body CV (described later).

FIG. 2 shows clutch engaged and disengaged states and brake applied and released states of the friction elements (C1–C3, B1–B4, and F1–F3) of the planetary-gear transmission system, for establishing the forward 5-speed (1st, 2nd, 3rd, 4th, and 5th), and reverse 1-speed (Reverse) gear positions. In FIG. 2, Δ (tri-angle) denotes a state where the friction element (at least one of one-way clutches F1, F2, and F3) takes part in torque transmission only during a power-on operating mode. The letter C denotes a state where the friction element (at least one of one-way clutches F1 and F2) takes part in torque transmission only during a coasting state of the vehicle. ● (black-dot) denotes a state where hydraulic pressure is supplied to the friction element (either one of brakes B2 and B4), but the transmission output is unaffected. Clutch-engagement or brake-application is marked with a voided circle ○ indicated by a solid line. On the other hand, clutch-disengagement or brake-release is indicated by a blank space. Each of voided circles (○) in parentheses denotes a state where the friction element (either one of brakes B2 and B3) is applied only during an overrunning mode.

Figure 3:
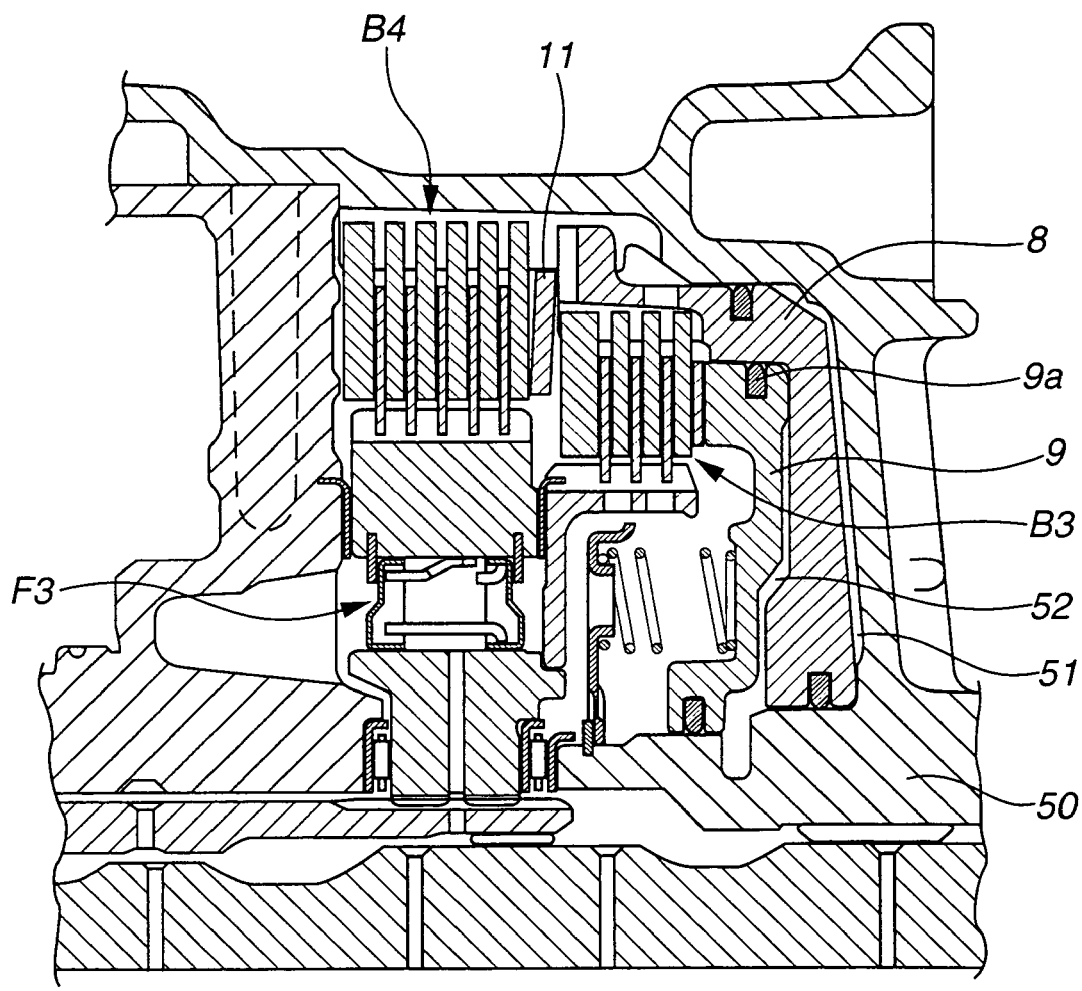
FIG. 3 is an enlarged longitudinal cross sectional view showing third and fourth brakes B3 and B4 included in the automatic-transmission servo system of the embodiment.

Referring now to FIG. 3, there is shown the enlarged cross section of the essential part containing third and fourth brakes B3 and B4, and third one-way clutch F3. Third and fourth brakes B3 and B4 provide a double brake structure. As described later, fourth brake B4 serving as a start frictional-engagement element, which is engaged or applied during a vehicle starting period, whereas third brake B3 serves as an engine braking means during a coasting state of the vehicle. As clearly shown in FIG. 3, fourth brake B4 is operably laid out on the outer periphery of third brake B3. A fourth-brake piston 8 of fourth brake B4 is forced axially leftwards (viewing FIG. 3) by way of hydraulic pressure applied to a cylinder chamber 51 to engage clutch plates (a multiple-clutch portion) of fourth brake B4. Cylinder chamber 51 is defined by the substantially radially-extending partition wall portion of a transmission casing 50. Third-brake clutch plates (a third-brake multiple-clutch portion) and a third-brake piston 9 are arranged on the inner periphery of fourth-brake piston 8. Third-brake piston 9 is forced axially leftwards (viewing FIG. 3) by way of hydraulic pressure applied to a cylinder chamber 52 defined in fourth-brake piston 8. As can be seen from the cross section of FIG. 3, third brake B3 is operably supported on the transmission casing via fourth-brake piston 8. In more detail, the outer periphery of third-brake piston 9 axially slidably fits onto the inner periphery of fourth-brake piston 8 via a D-shaped ring (simply, D ring) 9a, which provides a fluid-tight seal between the sliding surface (the inner periphery) of fourth-brake piston 8 and the sliding surface (the outer periphery) of third-brake piston 9 and defines a fluid-tight chamber (i.e., cylinder chamber 52) in conjunction with the inner peripheral wall surface of fourth-brake piston 8. In the shown embodiment, D ring 9a is fitted into an annular groove formed in the outer periphery of third-brake piston 9. As can be appreciated from the clutch- and brake-application logic table of FIG. 2, during ratio control except a normal starting period, third brake B3 is designed to be applied only when hydraulic pressure is supplied to fourth brake B4.

Also provided is a coned disc spring 11 serving as a pushing plate for clutch plates (a multiple-clutch portion) of fourth brake B4, when fourth brake B4 is applied by the axial leftward stroke of fourth-brake piston 8. Coned disc spring 11 also serves as a retainer needed for application of third brake B3. By the use of coned disc spring 11, serving as the pushing plate for application of fourth brake B4 and also serving as the retainer for application of third brake B3, when third brake B3 is applied by way of axial movement of third-brake piston 9, the brake applying force for third brake B3 is also transmitted via coned disc spring 11 directly to the clutch plates of fourth brake B4. Regarding a power-transmission path, third and fourth brakes B3 and B4, each comprised of a multiple disk clutch, are arranged in series to each other.

When the selector lever is changed from the N (neutral) range to the D (drive) range by the driver, a so-called N→D select control (neutral-to-drive range selection control) is initiated. In accordance with the N→D select control, the apply pressure is first supplied to fourth brake B4. As is generally known, in the drive range and 1st gear (low gear), there is an increased tendency for select-shock to occur owing to rapid transmission of engine torque. To avoid the undesirable select-shock (shock torque), first clutch C1 is temporarily engaged and thereafter disengaged. That is, just after the N→D selection, the control system operates to prevent the rear end of the vehicle from undesirably squatting down on the road by engaging the frictional-engagement element that realizes the higher gear than the 1st gear (low gear). In the system of the embodiment, the apply pressure of first clutch C1 is detected by a first hydraulic pressure switch 5 (see FIG. 5).

During the vehicle's starting period, in the same manner as the N→D select control discussed above, fourth brake B4 is shifted to the applied state. At the same time, the electronic engine control system (ECU) executes the torque-down control responsively to input information (or a command signal) regarding the torque-down amount, which is generated from the electronic automatic transmission control system (ATCU), so that the maximum input torque transmitted into the automatic transmission is properly limited to a desired torque value based on a required torque-down amount calculated by the processor of the ATCU. For instance, when the accelerator pedal is rapidly depressed by the driver due to a driver's intention for quick vehicle acceleration, it is desirable to set the required torque-down amount to a comparatively smaller value. However, assuming that the required torque-down amount is set to an excessively small value, the torque capacity of the frictional-engagement element has to be adequately increased. In other words, this means large-sizing of fourth brake B4. To avoid this, when the torque-down control is executed during the starting period, third brake B3, which may be usually applied during the coast engine-braking operating mode, is also applied. Torque, required for the starting period, can be properly shared between two frictional-engagement elements, that is, third brake B3 as well as fourth brake B4. In the system of the embodiment, the apply pressure of third brake B3 is detected by a second hydraulic pressure switch 6 (see FIG. 5). However, as hereunder described in detail in reference to the explanatory drawings shown in FIGS. 4A and 4B, when third brake B3 is also applied in addition to application of fourth brake B4, the previously-described problem of the undesirably detached D ring has to be taken into account, because of the double brake structure of third and fourth brakes B3 and B4 arranged in series to each other with respect to the power transmission path.

Figure 4A:
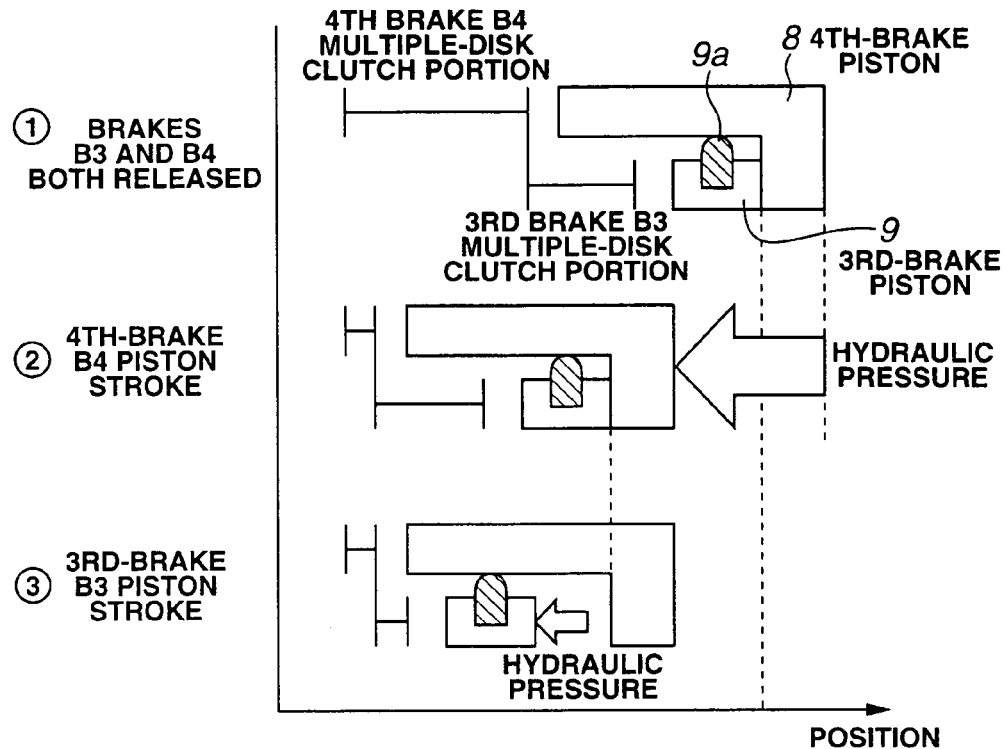
FIGS. 4A and 4B are explanatory views showing the relationship between the piston stroke of third brake B3 and the piston stroke of fourth brake B4 depending on the piston-stroke order of the third-brake and fourth-brake pistons.
Figure 4B:
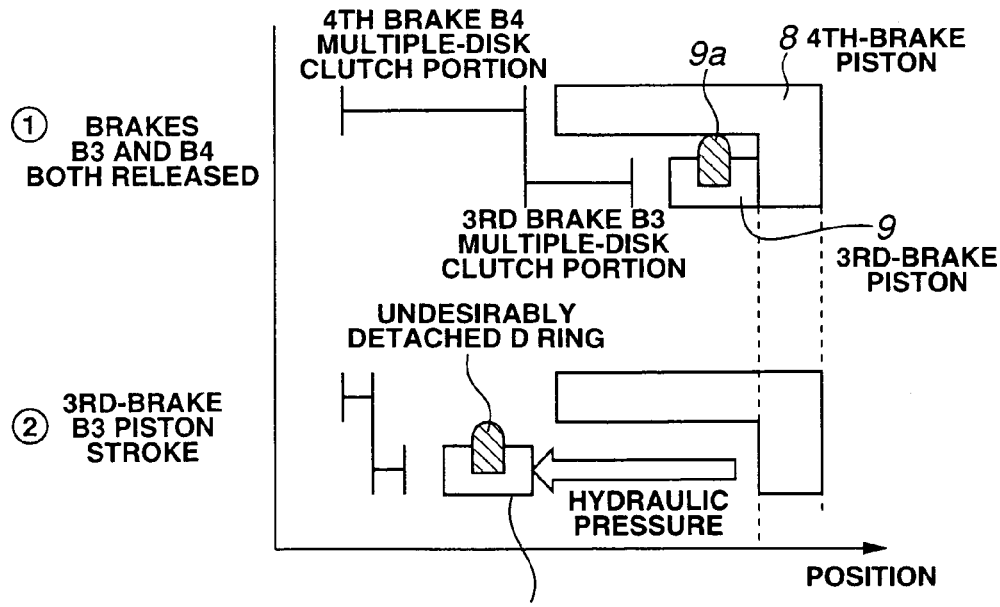

Referring now to FIGS. 4A and 4B, there are shown the relationship between the stroke of third-brake piston 9 and the stroke of fourth-brake piston 8 in two different states, namely, one being a state where the piston stroke of third brake B3 takes place after the piston stroke of fourth brake B4, in other words, in presence of application of third brake B3 after application of fourth brake B4 (see FIG. 4A), and the other being a state where the piston stroke of third brake B3 has occurred before the piston stroke of fourth brake B4 (see FIG. 4B). More concretely, as shown in FIG. 4B, when the piston stroke of third-brake piston (the inside piston) 9 occurs before the piston stroke of fourth-brake piston (the outside piston) 8, coned disc spring 11, serving as the third-brake retainer, is pushed axially, and as a result the piston stroke of fourth brake B4 also takes place owing to the axial movement of coned disc spring 11, also serving as the fourth-brake pushing plate. Thus, the final piston-stroke amount of third brake (the inside piston) B3 becomes the summed stroke of the piston stroke of third-brake piston 9 and the piston stroke of fourth-brake piston 8 created during application of fourth brake B4, occurring subsequently to application of third brake B3. Owing to the summed stroke of third piston B3, there is a possibility that the D ring 9a, fitted onto the outer periphery of third-brake piston (the inside piston) 9 of third brake B3, is brought out of sliding-fit with the inner periphery of fourth-brake piston (the outside piston) 8 of fourth brake B4. That is, as can be seen from the explanatory view of FIG. 4B, when the piston stroke of third-brake piston (the inside piston) 9 occurs before the piston stroke of fourth-brake piston (the outside piston) 8, there is a possibility that the inside piston becomes undesirably detached from the outside piston. In order to avoid the problem of the undesirably detached D ring, as can be seen from the explanatory view of FIG. 4A, third brake B3 has to be applied after application of fourth brake B4. Such a countermeasure control routine against the problem of the undesirably detached D ring (the undesirably detached inside piston), related to the explanatory view shown in FIG. 4A, will be hereinafter described in detail in reference to FIGS. 5, 6 and 7 (in particular, the flow chart of FIG. 7).

Figure 5:
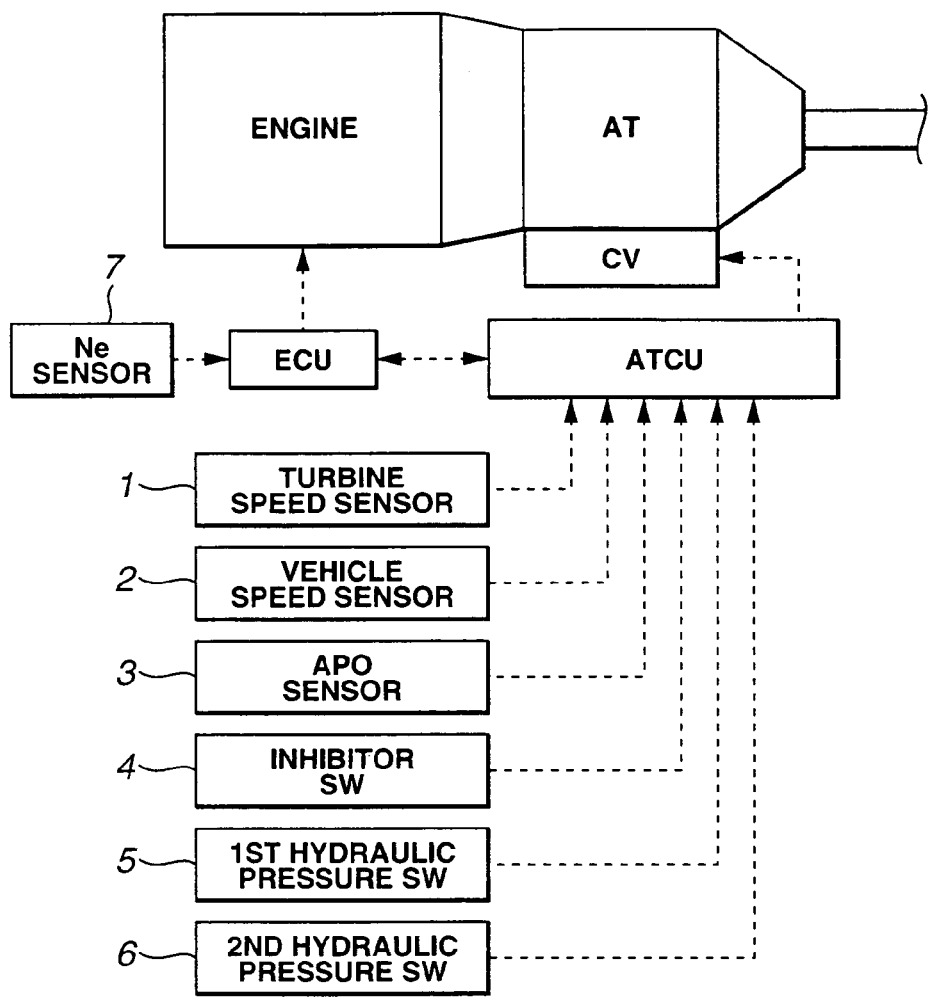
FIG. 5 is a system block diagram showing both an electronic engine control system (ECU) capable of executing the torque-down control and an electronic automatic transmission control system (ATCU) capable of executing the control for the servo system of the embodiment.

Referring now to FIG. 5, there is shown the system block diagram of the control system of the servo system of the embodiment, capable of executing the countermeasure control routine against the problem of the undesirably detached D ring. As clearly shown in FIG. 5, the control system is mainly comprised of the electronic engine control system (ECU) that controls the engine power output (engine output torque), the electronic automatic transmission control system (ATCU) that performs ratio control of the automatic transmission, and the control valve (CV) that outputs a controlled hydraulic pressures to each of the friction elements (C1, C2, C3, B1, B2, B3, B4, F1, F2, and F3), responsively to a command signal from the ATCU. Each of the ECU and the ATCU generally comprises a microcomputer. In a similar manner to the ECU, the ATCU includes an input/output interface (I/O), memories (RAM, ROM), and a microprocessor or a central processing unit (CPU). For mutual communication, the ATCU communicates through a data link with the ECU. The input/output interface (I/O) of the ATCU receives input information from various engine/vehicle switches and sensors, namely a turbine speed sensor 1, a vehicle speed sensor 2, an accelerator position sensor (or an APO sensor) 3, an inhibitor switch 4, and first and second hydraulic pressure switches 5 and 6. Within the ATCU, the central processing unit (CPU) allows the access by the I/O interface of input informational data signals from the previously-discussed engine/vehicle switches and sensors 1–6. Turbine speed sensor 1 is provided to monitor or detect the turbine speed Nt, that is, the input speed of the automatic transmission or the rotational speed of transmission input shaft IN. Vehicle speed sensor 2 is provided to detect the vehicle speed VSP, in other words, the output speed of the automatic transmission or the rotational speed of transmission output shaft OUT. Accelerator position sensor 3 is provided to detect the stroke amount (the manipulated variable) of the accelerator pedal depressed by the driver, in other words, an accelerator opening APO. The purpose of inhibitor switch 4 is to inform the ATCU of the current selector lever position, that is, the selected range. First hydraulic pressure switch 5 is provided to detect the apply pressure of first clutch C1, whereas second hydraulic pressure switch 6 is provided to detect the apply pressure of third brake B3. The CPU of the ATCU is responsible for carrying the control program stored in memories and is capable of performing necessary arithmetic and logic operations containing the ratio control and the countermeasure control routine against the problem of the undesirably detached D ring, and the torque-down control. Computational results (arithmetic calculation results), that is, calculated output signals are relayed through the output interface circuitry of the ATCU (or the ECU) to output stages. In addition to the sensors/switches previously described, an engine speed sensor 7, usually comprised of a crank angle sensor or a crankshaft position sensor, is also provided to inform the ECU of the engine speed Ne as well as the relative position of the engine crankshaft. The ATCU performs the ratio control based on the signals from these sensors/switches 1–6. As necessary, the ATCU outputs a torque-down requirement command signal indicative of a torque-down requirement and the required torque-down amount (the controlled variable of torque-down control) to the ECU, such that the maximum input torque transmitted into the servo system of the automatic transmission is properly limited to a desired torque value based on the command signal value from the ATCU. The torque-down control function is enabled or disabled in accordance with the preprogrammed torque-down control requirement map (simply, torque-down requirement map) shown in FIG. 6.

Figure 6:
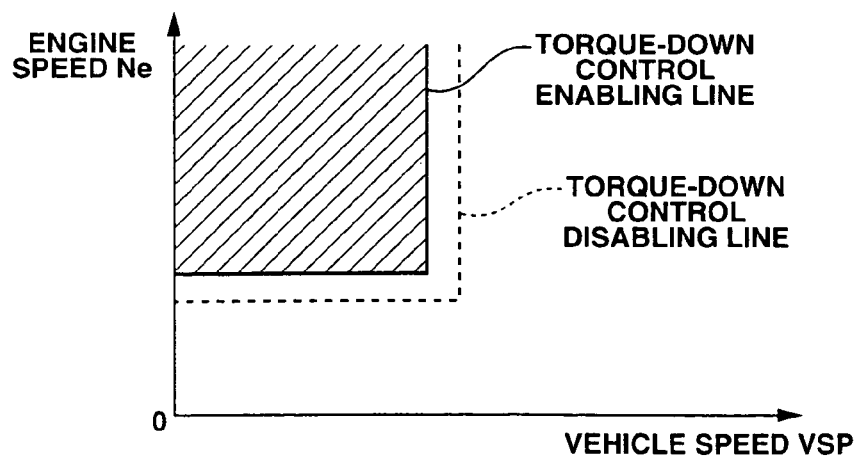
FIG. 6 is a preprogrammed torque-down requirement map.

As can be seen from the torque-down requirement map of FIG. 6, the presence or absence of the torque-down requirement is determined depending on whether the operating point based on both the vehicle speed VSP and engine speed Ne is within a predetermined torque-down control enabling area (the right-hand diagonal shading area defined by the predetermined torque-down control function enabling line (or the torque-down requirement ON line) indicated by the solid line in FIG. 6). Therefore, when the operating point, based on the vehicle speed VSP and engine speed Ne, is within the predetermined torque-down control enabling area, the ATCU generates the command signal indicative of the torque-down requirement to the ECU. On the other hand, the broken line of FIG. 6 indicates a predetermined torque-down control function disabling line (or the torque-down requirement OFF line). In FIG. 6, the slight offset area defined between the predetermined torque-down control function enabling line (the solid line) and the predetermined torque-down control function disabling line (the broken line) means a predetermined hysteresis by way of which undesired control hunting is prevented.

Figure 7:
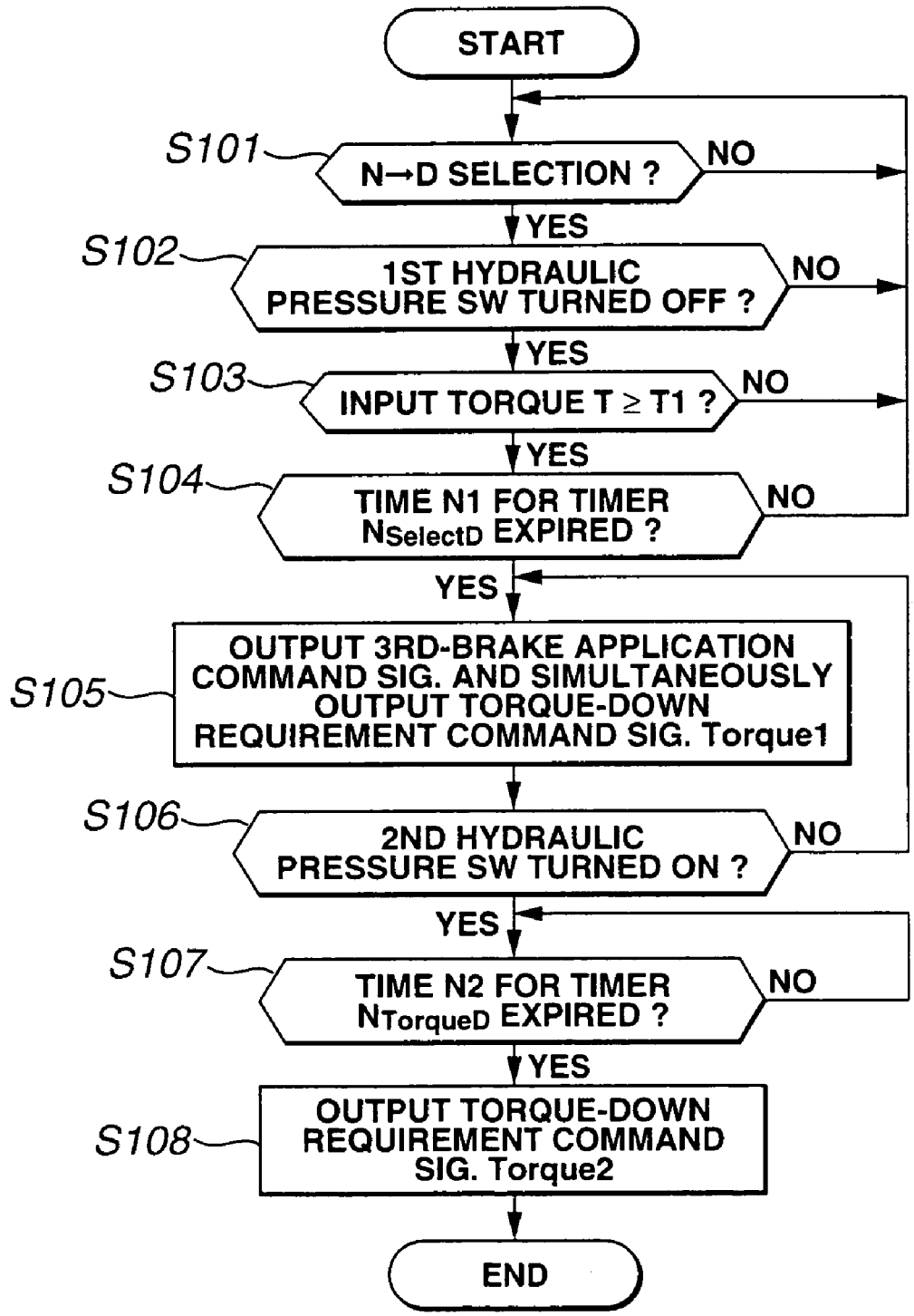
FIG. 7 is a flow chart showing a countermeasure control routine against the problem of the undesirably detached D ring (the undesirably detached inside piston).

Referring now to FIG. 7, there is shown the countermeasure control routine against the problem of the undesirably detached D ring (the undesirably detached inside piston) by way of the use of a select delay timer $N_{SelectD}$ in the automatic transmission having the N→D select control function (neutral-to-drive range select control function). The countermeasure control routine of FIG. 7 is executed as time-triggered interrupt routines to be triggered every predetermined sampling time intervals.

At step S101, a check is made to determine whether the neutral-to-drive range selection (N→D selection) is present or absent. In the presence of N→D selection, a count value of select delay timer $N_{SelectD}$ is incremented. Thereafter, the routine proceeds to step S102. In the absence of N→D selection, step S101 is repeated.

At step S102, a check is made to determine whether first hydraulic pressure switch 5 becomes turned OFF. When the answer to step S102 is in the affirmative (YES), that is, with first hydraulic pressure switch 5 turned OFF, application of fourth brake B4 is initiated, and then the routine proceeds to step S103. Conversely when the answer to step S102 is in the negative (NO), that is, with first hydraulic pressure switch 5 turned ON, steps S101 and S102 are repeatedly executed.

At step S103, a check is made to determine whether the magnitude of input torque T is greater than or equal to a predetermined input torque value T1. When T≧T1, the routine proceeds from step S103 to step S104. Conversely when T<T1, steps S101 through S103 are repeatedly executed. The input torque T may be calculated or retrieved based on the sensor signal from turbine speed sensor 1, from a preprogrammed turbine speed versus input torque characteristic map showing how input torque T has to be varied relative to the turbine speed. In lieu of map-retrieval from the preprogrammed turbine speed versus input torque characteristic map, input torque T may be detected directly by means of a torque sensor, which is attached to transmission input shaft IN of the automatic transmission.

At step S104, a check is made to determine whether the count value of select delay timer $N_{SelectD}$ reaches a predetermined delay time N1, in other words, the predetermined delay time N1 has expired. When the answer to step S104 is affirmative (YES), that is, when the predetermined delay time N1 has expired, step S105 occurs. Conversely when the predetermined delay time N1 has not yet expired, steps S101–S104 are repeatedly executed.

At step S105, a third-brake application command signal is output to apply the third brake B3, and at the same time a first torque-down requirement command signal Torque1 suited for a 1st gear range stall period is output. Subsequently to step S105, step S106 occurs.

At step S106, a check is made to determine whether second hydraulic pressure switch 6 becomes turned ON. When the answer to step S106 is affirmative (YES), that is, with second hydraulic pressure switch 6 turned ON, a count value of a torque-down delay timer $N_{TorqueD}$ is incremented from "0", and thereafter step S107 occurs. Conversely when the answer to step S106 is negative (NO), that is, with second hydraulic pressure switch 6 turned OFF, steps S105–S106 are repeatedly executed.

At step S107, a check is made to determine whether the count value of torque-down delay timer $N_{TorqueD}$ reaches a predetermined delay time N2, in other words, the predetermined delay time N2 has expired. When the answer to step S107 is affirmative (YES), that is, when the predetermined delay time N2 has expired, step S108 occurs. Conversely when the predetermined delay time N2 has not yet expired, step S107 is repeatedly executed.

At step S108, a second torque-down requirement command signal Torque2 suited for a third-brake B3 application period is output.

The details of the countermeasure control routine of FIG. 7 against the problem of the undesirably detached D ring are hereunder described in reference to the time charts shown in FIGS. 9A–9I.

[Brake Application Procedures for 3RD Brake B3]

At the time t1, when the selected range is switched from the N range to the D range (see FIG. 9A), that is, in the presence of N→D selection, the count value of select delay timer $N_{SelectD}$, initialized to "0", is incremented from "0". Thereafter, at the time t2, the N→D select control is initiated and thus hydraulic pressure is temporarily applied to first clutch C1 (see FIG. 9C). As a result of this, first hydraulic pressure switch 5, serving to detect the apply pressure of first clutch C1, is turned ON (see FIG. 9D). Thereafter, at the time t3, first hydraulic pressure switch 5 becomes turned OFF (see FIG. 9D). Hereupon, it is very important to determine whether or not first hydraulic pressure switch 5 has been completely switched from the turned-ON state to the turned-OFF state, because there is an increased tendency for undesirable interlock to occur when third brake B3 is applied in the engaged state of first clutch C1. Additionally, it is very important to determine whether or not first hydraulic pressure switch 5 has been completely switched to the turned-OFF state, because the timing of the start of application of fourth brake B4 is determined depending on whether first hydraulic pressure switch 5 has been completely turned-OFF during the N→D select control mode. At the time t4 the stroke of fourth-brake piston 8 begins to develop owing to the pressure rise in the apply pressure of fourth brake B4 (see FIG. 9B). Just after t4, as soon as the predetermined delay time N1 for select delay timer $N_{SelectD}$ has expired at the time t41, the third-brake application command signal is output so as to apply the third brake B3 (see FIGS. 9F and 9G and see the flow from step S104 to step S105 in FIG. 7). At this time, the engine speed tends to rise, and therefore the engine-vehicle operating point becomes within the predetermined torque-down control enabling area (the right-hand diagonal shading area of FIG. 6). Thus, at the same time (i.e., at the time t41), the first torque-down requirement command signal Torque1 suited for the 1st gear range stall period is output (see FIG. 9I and also see step S105 in FIG. 7). As can be seen from the preprogrammed torque-down requirement map of FIG. 6, the timing of the output of torque-down requirement command signal Torque1 is determined based on both the engine speed and vehicle speed regardless of whether each of the frictional-engagement elements, such as brakes B3, B4, is engaged or disengaged. At the time t42, second hydraulic pressure switch 6, serving to detect the apply pressure of third brake B3, is turned ON owing to the rise in the apply pressure of third brake B3 (see FIGS. 9G and 9H). From the time t42, the count value of torque-down delay timer $N_{TorqueD}$ begins to increase from "0" (see FIG. 9I and the flow from step S106 to step S107 in FIG. 7). Third-brake piston 9 begins to move axially from the time t5 when a stroke of fourth-brake piston 8 has been completed (see FIGS. 9B and 9G). The apply pressure of third brake B3 begins to rise from the time t6 when a stroke of third-brake piston 9 has been completed (see FIG. 9G). As soon as the predetermined delay time N2 for torque-down delay timer $N_{TorqueD}$ has expired at the time t7, the second torque-down requirement command signal Torque2, which is suited for the third-brake B3 application period and less than the first torque-down requirement command signal Torque1 suited for the 1st gear range stall period, is output (see FIG. 9I and the flow from step S107 to step S108 in FIG. 7). This is because of the full stroke of third-brake piston 9 and the full stroke of fourth-brake piston 8, that is, completion of application of both of the third and fourth brakes B3 and B4. As discussed above, according to the third-brake B3 application procedures of the system of the embodiment executing the routine of FIG. 7, in order to prevent undesirable interlock, termination of the N→D select control is identified and determined by the turned-OFF state of first hydraulic pressure switch 5. Then, in order to determine whether the operating condition corresponds to a quick starting period, a further check is made to determine whether the magnitude of input torque T is greater than or equal to predetermined input torque value T1, that is, $T \geq T1$. When $T \geq T1$, in other words, during quick starting, third brake B3 begins to apply after the processor of the ATCU has determined and ascertained the start of application of fourth brake B4. That is, the ATCU serves as a servo system control device that controls the operations of third and fourth brakes B3 and B4. Thus, the system of the embodiment can certainly avoid D ring 9a of third-brake piston (the inside piston) 9 from being undesirably detached from fourth-brake piston (the outside piston) 8. In the system of the embodiment executing the routine shown in FIG. 7, although the condition of $T \geq T1$ (see step S103) is used to determine whether the current operating condition is a quick starting period, step S103 may be eliminated. This is because the magnitude of input torque T is generally great during the starting period. In this case, a third-brake application command signal has to be output just after a predetermined delay time has been elapsed from the time when a fourth-brake application command signal has been output.

In addition to the above, according to the system of the embodiment, the torque-down requirement command signal is maintained at the relatively large, first torque-down requirement command signal Torque1, until third and fourth brakes B3 and B4 are both completely applied. Then, the torque-down requirement command signal is changed from the relatively large, first torque-down requirement command signal Torque1 to the relatively small, second torque-down requirement command signal Torque2 (<Torque1), after applications of both of third and fourth brakes B3 and B4 has been completed. Thus, it is possible to reliably prevent undesired slippage of each of the frictional-engagement elements.

[Brake Release Procedures for 3RD Brake B3]

Figure 8:
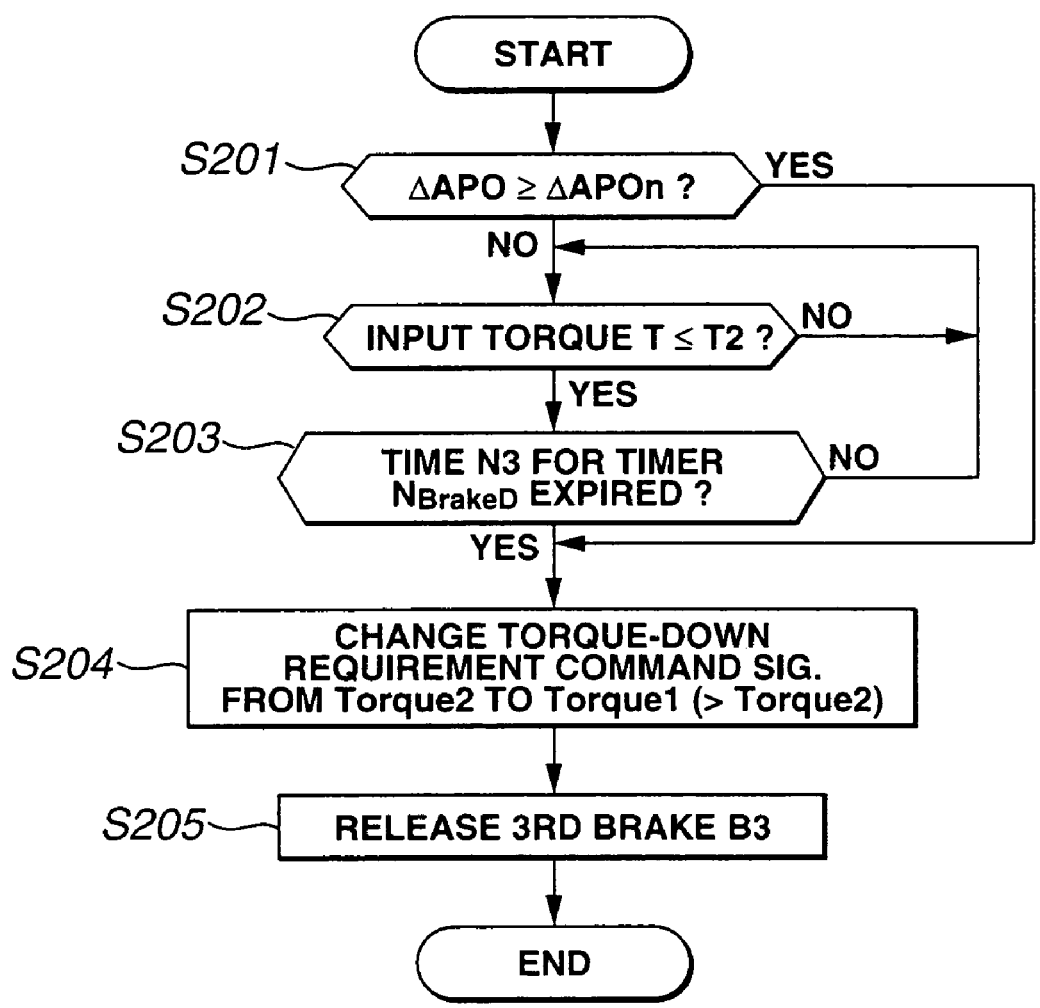
FIG. 8 is a flow chart showing a brake release routine of third brake B3 included in the servo system of the embodiment.

The 3rd brake B3 release procedures are hereunder described in detail in reference to the flow chart shown in FIG. 8. The 3rd brake B3 release routine of FIG. 8 is also executed time-triggered interrupt routines to be triggered every predetermined sampling time intervals.

At step S201, a check is made to determine whether a time rate of change ΔAPO of accelerator opening APO is greater than or equal to a predetermined threshold value ΔAPOn. When the answer to step S201 is affirmative (YES), that is, ΔAPO≧ΔAPOn, the routine jumps from step S201 to step S204. Conversely when the answer to step S201 is negative (NO), that is, ΔAPO<ΔAPOn, the routine proceeds to step S202.

At step S202, a check is made to determine whether the magnitude of input torque T is less than or equal to a predetermined input torque value T2. When T≦T2, the count value of a third-brake delay timer $N_{BrakeD}$ is incremented from "0", and then the routine proceeds from step S202 to step S203. Conversely when T>T2, steps S202 and S203 are repeatedly executed.

At step S203, a check is made to determine whether the count value of third-brake delay timer $N_{BrakeD}$ reaches a predetermined delay time N3, in other words, the predetermined delay time N3 has expired. When the answer to step S203 is affirmative (YES), that is, when the predetermined delay time N3 has expired, step S204 occurs. On the contrary when the predetermined delay time N3 has not yet expired, steps S202 and 203 are repeatedly executed.

At step S204, the torque-down requirement command signal is switched or changed from the relatively small, second torque-down requirement command signal Torque2 suited for the third-brake B3 application period to the relatively large, first torque-down requirement command signal Torque1 suited for the 1st gear range stall period.

At step S205, third brake B3 is released.

Actually, the details of the 3rd brake B3 release control flow achieved during a moderate release time period of the accelerator pedal are different from the details of the 3rd brake B3 release control flow achieved during a quick release time period of the accelerator pedal. Therefore, the 3rd brake B3 release control flow achieved during the moderate accelerator-pedal release time period will be hereinafter described in detail by reference to the time charts shown in FIGS. 10A–10I. On the other hand, the 3rd brake B3 release control flow achieved during the quick accelerator-pedal release time period will be hereinafter described in detail by reference to the time charts shown in FIGS. 11A–11I.

[B3 Release Control During Moderate ACC-Pedal Release Time]

The accelerator pedal is moderately released from the time t21 (see FIG. 10D) by the driver, and thus input torque T begins to gradually reduce (see FIG. 10F). Thereafter, at the time t22, the magnitude of input torque T becomes less than or equal to predetermined input torque value T2 below which application of only the fourth brake B4 enables sufficient torque transmission without applying both of the brakes B3 and B4. Therefore, the count value of third-brake delay timer $N_{BrakeD}$ is incremented from "0" (see FIG. 10G and the flow from step S202 to step S203). As soon as the predetermined delay time N3 for third-brake delay timer $N_{BrakeD}$ has expired at the time t23, the torque-down requirement command signal is changed from the relatively small, second torque-down requirement command signal Torque2 suited for the third-brake B3 application period to the relatively large, first torque-down requirement command signal Torque1 suited for the 1st gear range stall period (see FIG. 10I). At the same time (i.e., at the time t23), the third brake B3 release action starts (see FIG. 10G and the flow from step S203 via step S204 to step S205 in FIG. 8). During the 3rd brake B3 release control, the hydraulic pressure, which is applied to third-brake piston 9, is gradually released and dropped, so as to prevent shocks from occurring. Thereafter, at the time t24, second hydraulic pressure switch 6 becomes turned OFF.

[B3 Release Control During Quick ACC-Pedal Release Time]

When the accelerator pedal is quickly released at the time t31 by the driver, the time rate of change ΔAPO in accelerator opening APO momentarily exceeds predetermined threshold value ΔAPOn. After a brief moment, at the time t32 the accelerator opening APO becomes "0" and the time rate of change ΔAPO becomes "0" (see FIGS. 11D and 11F). In such a case, the torque-down requirement command signal is rapidly changed from the relatively small, second torque-down requirement command signal Torque2 suited for the third-brake B3 application period to the relatively large, first torque-down requirement command signal Torque1 suited for the 1st stall period, without operating third-brake delay timer $N_{BrakeD}$, and soon the third brake B3 release action starts (see FIGS. 11G and 11I and the flow from step S201 via step S204 to step S205 in FIG. 8). Basically, third brake B3 is applied when a better engine braking effect is required during the vehicle's coast condition where torque is transferred from rotating drive wheels back to the engine. Assuming that the accelerator pedal is rapidly released by the driver and an engine braking force is abruptly created, there is a possibility of the degraded vehicle drivability. For the reasons discussed above, in the presence of such a quick accelerator-pedal release, the system of the embodiment operates to quickly release the third brake B3, thereby realizing the servo system control of the starting period suited to the driver's intention.

Figure 12:
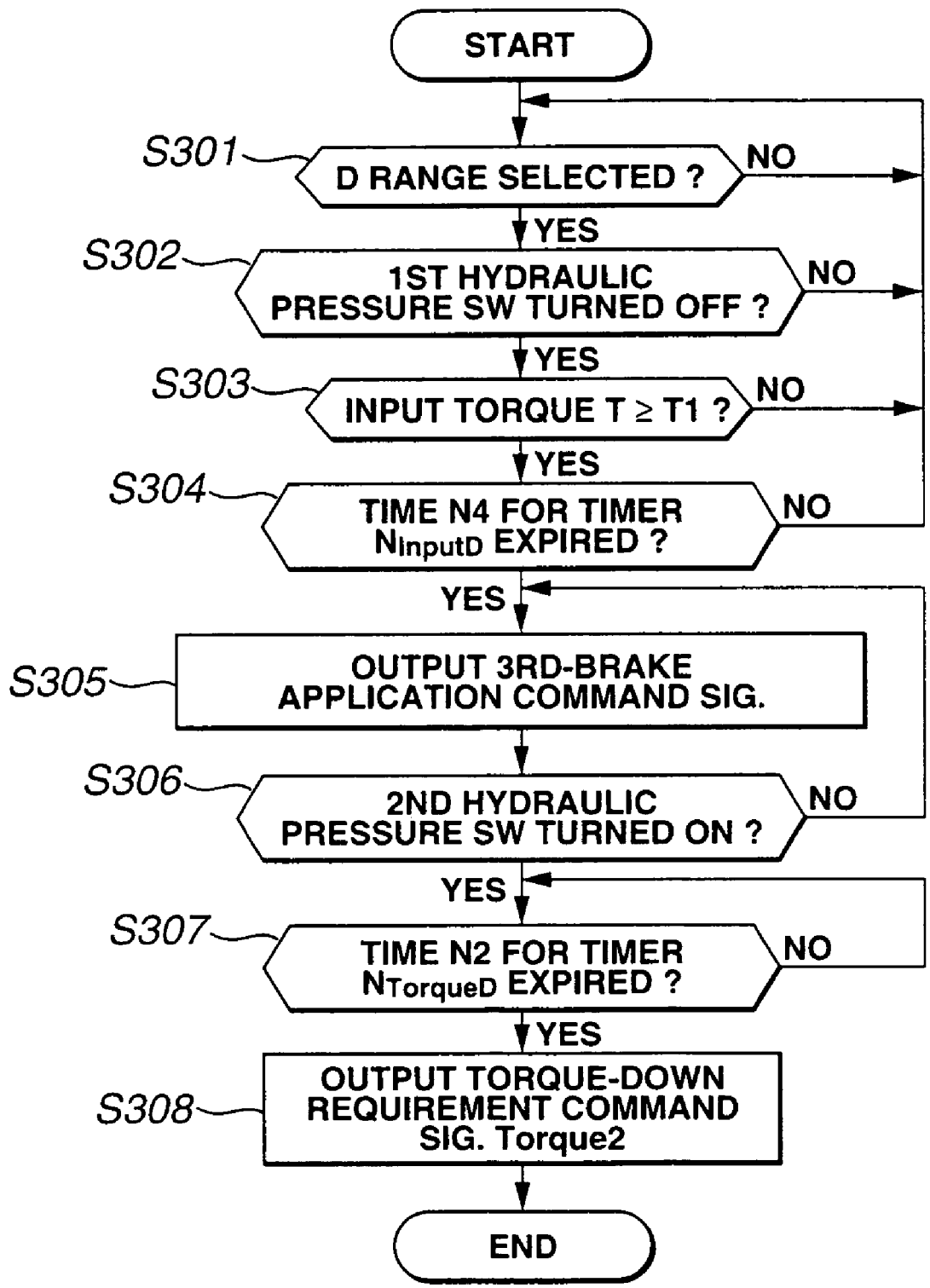
FIG. 12 is a flow chart showing a modified countermeasure control routine against the problem of the undesirably detached D ring.

Referring now to FIG. 12, there is shown the modified countermeasure control routine against the problem of the undesirably detached D ring, executed by the processor of the ATCU. The modified arithmetic processing shown in FIG. 12 is also executed as time-triggered interrupt routines to be triggered every predetermined sampling time intervals. The modified routine of FIG. 12 is similar to the routine of FIG. 7, except that steps S101 and S104 included in the routine shown in FIG. 7 are replaced with steps S301 and S304 included in the routine shown in FIG. 12. In case of the control routine shown in FIG. 7, the system uses the select delay timer $N_{selectD}$ whose count value is incremented from "0" from the point of time of N→D selection and compared to the predetermined delay time N1 (see the trailing edge in FIG. 9A and the count-up starting point of select delay timer $N_{SelectD}$ in FIG. 9F). On the other hand, in case of the modified control routine shown in FIG. 12, the system uses an input-torque delay timer $N_{InputD}$ whose count value is compared to a predetermined delay time N4 and incremented from "0" from the point of time when the condition defined by T≧T1 is satisfied (see the intersection point of the horizontal broken line indicative of predetermined input torque value T1 and the solid line indicative of variations in the actual input torque T in FIG. 13D and the count-up starting point of input-torque delay timer $N_{InputD}$ in FIG. 13E). Steps S302, S303, and S305–S308 in the routine shown in FIG. 12 are respectively similar to steps S102, S103, and S105–S108 in the routine shown in FIG. 7. Steps S301 and S304 will be hereinafter described in detail with reference to the accompanying drawings, while steps S302, S303, and S305–S308 will be briefly described hereunder.

At step S301, a check is made to determine whether the selector lever is positioned in the D (drive) range. When the answer to step S301 is affirmative (YES) and thus the D range is selected by the driver, the routine proceeds to step S302. Conversely when the answer to step S301 is negative (NO), step S301 is repeated.

At step S302, a check is made to determine whether first hydraulic pressure switch 5 becomes turned OFF. When the answer to step S302 is affirmative (YES) and thus pressure switch 5 becomes turned OFF, the routine proceeds to step S303. Conversely when the answer to step S302 is negative (NO) and thus pressure switch 5 is turned ON, steps S301 and S302 are repeatedly executed.

At step S303, a check is made to determine whether the magnitude of input torque T is greater than or equal to the predetermined input torque value T1. When T≧T1, the count value of input-torque delay timer $N_{InputD}$ is incremented from "0", and then the routine proceeds from step S303 to step S304. Conversely when T<T1, steps S301–S303 are repeatedly executed.

At step S304, a check is made to determine whether a check is made to determine whether the count value of input-torque delay timer $N_{InputD}$ reaches the predetermined delay time N4, in other words, the predetermined delay time N4 has expired. When the answer to step S304 is affirmative (YES), that is, when the predetermined delay time N4 has expired, step S305 occurs. Conversely when the predetermined delay time N4 has not yet expired, steps S301–S304 are repeatedly executed.

At step S305, a third-brake application command signal is output to apply the third brake B3. Subsequently to step S305, step S306 occurs.

At step S306, a check is made to determine whether second hydraulic pressure switch 6 becomes turned ON. When the answer to step S306 is affirmative (YES) and thus pressure switch 6 becomes turned ON, the count value of the torque-down delay timer $N_{TorqueD}$ is incremented from "0", and then the routine proceeds from step S306 to step S307. Conversely when the answer to step S306 is negative (NO) and thus pressure switch 6 is turned OFF, steps S305 and S306 are repeatedly executed.

At step S307, a check is made to determine whether the count value of torque-down delay timer $N_{TorqueD}$ reaches the predetermined delay time N2, in other words, the predetermined delay time N2 has expired. When the answer to step S307 is affirmative (YES), that is, when the predetermined delay time N2 has expired, step S308 occurs. Conversely when the predetermined delay time N2 has not yet expired, step S307 is repeatedly executed.

At step S308, second torque-down requirement command signal Torque2 suited for the third-brake B3 application period is output.

The details of the modified countermeasure control routine of FIG. 12 against the problem of the undesirably detached D ring are hereunder described in reference to the time charts shown in FIGS. 13A–13G.

[Brake Application Procedures for 3RD Brake B3]

As can be seen in FIG. 13C, at the time t31, first hydraulic pressure switch 5 is turned OFF owing to a pressure fall in the apply pressure, which works on the first clutch C1 for the first clutch apply during the N→D select control. As soon as the magnitude of input torque T exceeds the predetermined input torque value T1, indicative of quick starting, at the time t32 (see FIG. 13D), the count value of input-torque delay timer $N_{InputD}$ is incremented from "0" (see FIG. 13E). As soon as the predetermined delay time N4 for input-torque delay timer $N_{InputD}$ has expired at the time t33, the third-brake application command signal is output so as to apply the third brake B3 (see FIG. 13E and the flow from step S304 to step S305 in FIG. 12). At this time, owing to the engine speed rise, the engine-vehicle operating point becomes within the predetermined torque-down control enabling area (the right-hand diagonal shading area of FIG. 6). Although it is not clearly shown in the flow chart of FIG. 12, just after the output of the third-brake application command signal through step S305, in other words, midway between steps S305 and S306 in FIG. 12, the first torque-down requirement command signal Torque1 suited for the 1st gear range stall period is output. Thus, after the time t33 of FIG. 13G, the first torque-down requirement command signal Torque1 suited for the 1st gear range stall period is output. After this, second hydraulic pressure switch 6, serving to detect the apply pressure of third brake B3, is turned ON owing to the rise in the apply pressure of third brake B3 (see FIGS. 13E and 13F). At the time when second hydraulic pressure switch 6 is turned ON, the count value of torque-down delay timer $N_{TorqueD}$ begins to increase from "0" (see FIGS. 13F and 13G). As soon as the predetermined delay time N2 for torque-down delay timer $N_{TorqueD}$ has expired, the second torque-down requirement command signal Torque2 suited for the third-brake B3 application period is output (see FIG. 13G and the flow from step S307 to step S308 in FIG. 12), because of completion of application of both of the third and fourth brakes B3 and B4. As discussed above, according to the third-brake B3 application procedures of the system of the embodiment executing the modified routine of FIG. 12, the system enables or permits the third brake B3 to be applied after the predetermined time period has been elapsed from the point of time when the magnitude of input torque T1 exceeds the predetermined input torque value T1. Therefore, the system executing the modified routine shown in FIG. 12 can provide the same effects as the system executing the control routine shown in FIG. 7.

As will be appreciated from the above, in the servo system of the embodiment, the servo system control device, in other words, the ATCU, comprises a piston-stroke order control section that determines the timing of operation of each of the two adjacent pistons, namely third-brake piston 9 and fourth-brake piston 8, nested each other in the radial direction, such that the pistons 9 and 8 are operated in a specified piston-stroke order that the outside piston 8 is operated prior to the inside piston 9. Thus, it is possible to prevent the inside piston 9 (exactly, the inside-piston D ring 9a) from being undesirably detached from the outside piston 8, without increasing the entire axial size of the servo system.

Additionally, the inside and outside pistons 9 and 8 are operated in the specified piston-stroke order depending on a required friction-element torque capacity. As described previously, when the required friction-element torque capacity is less than or equal to the predetermined threshold value, only the outside piston 8 is operated to engage the associated brake B4. When the required torque capacity is greater than the predetermined threshold value, the inside and outside pistons (9, 8) are both operated to engage the respective brakes B3 and B4. Thus, it is possible to effectively properly apply the friction elements in the specified order, taking into account the required torque capacity.

Furthermore, during the starting period, the timing of operation of the inside piston 9, which is associated with the third brake B3 of the two adjacent brakes, is determined based on the first condition (see S103) where the magnitude of input torque T transmitted to the servo system is greater than or equal to the predetermined torque value T1 and the second condition (see S104) where the predetermined delay time N1 has elapsed from the time when the command signal for application of the start frictional-engagement element (i.e., fourth brake B4) is output. That is, during the starting period, when the first condition is satisfied and thus the system determines that the required torque capacity is comparatively great, and additionally the second condition is satisfied, there is no possibility that the inside piston 9 is operated prior to the piston stroke of the outside piston 8. In this manner, according to the system of the embodiment, when the required torque capacity is comparatively great during the starting period, the piston-stroke order of the inside and outside pistons 9 and 8 is determined so that the inside piston 9 starts to axially move after a stroke of the outside piston 8 has been completed, thus providing the previously-noted effects, that is, reduced axial size of the servo system, prevention of the inside piston undesirably detached from the outside piston, and achievement of required friction-element torque capacity.

Moreover, in the servo system of the embodiment, the servo system control device further comprises a torque-down requirement command section (see steps S105 and S108) through which the upper limit of input torque from the driving power source (the engine) to the servo system is limited to a desired torque value, and an engagement state detection section, that is, the second hydraulic pressure switch 6, that detects an engagement state of the third brake B3, which is engaged and disengaged by the inside piston 9. Thus, when the condition for torque-down requirement is satisfied, first, the system outputs the first torque-down requirement command (Torque1) that a required torque capacity is attainable by only the fourth brake B4, which is engaged by the outside piston. Thereafter, the system outputs the second torque-down requirement command Torque2 (<Torque1), just after the predetermined delay time N2 has elapsed from the time when the third brake (the inside multiple-disk clutch) B3 has applied subsequently to application of the fourth brake (the outside multiple-disk clutch) B4 in order to allow a greater required torque capacity. It is possible to certainly transmit torque with no slippage of each friction element included in the servo system. Properly decreasingly compensating for the torque-down amount, that is, switching from the first torque-down requirement command Torque1 to the second torque-down requirement command Torque2 (<Torque1) contributes to the enhanced acceleration performance during the starting period. In the shown embodiment, the output of the second torque-down requirement command Torque2 is timed based on a comparison result between the predetermined delay time N2 and the count value of torque-down delay timer $N_{TorqueD}$. In lieu thereof, the output of the second torque-down requirement command Torque2 may be timed by way of a means that detects or estimates the completely engaged state of the third brake B3, which is applied or engaged by the inside piston 9.

Additionally, the system of the embodiment further takes into account the particular condition where the magnitude of input torque T rapidly reduces when the accelerator pedal is rapidly released by the driver. That is, the timing of releasing action of the third brake B3, which is applied and released by the inside piston 9, is determined based on the time rate of change ΔAPO of the accelerator pedal's manipulated variable APO in an accelerator pedal release direction. In the presence of the rapid release of the accelerator pedal, the third brake (the inside multiple-disk clutch) B3 can be quickly released or disengaged by the return stroke of the inside piston 9. This enables and ensures the friction-element torque capacity suited for the driver's intention.

The entire contents of Japanese Patent Application No. 2003-207051 (filed Aug. 11, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A servo system employing at least two multiple disk clutches arranged in series to each other in an axial direction and at least two pistons used for engagement and disengagement of the respective clutches and arranged to be nested each other so that one of the pistons fits inside the other, comprising:

a servo system control device comprising,
(a) a piston-stroke order control section that determines a timing of operation of each of the pistons for engagement of the respective clutches so that the pistons are operated in a specified order that the outside piston is operated prior to the inside piston.

2. The servo system as claimed in claim 1, wherein:
the timing of operation of each of the pistons for engagement is determined, depending on a required friction-element torque capacity, so that the pistons are operated in the specified order that the outside piston is operated prior to the inside piston.

3. The servo system as claimed in claim 2, wherein:
only the outside piston is operated to engage one of the clutches when the required friction-element torque capacity is less than or equal to a predetermined threshold value, and both of the inside and outside pistons are operated to engage the respective clutches when the required friction-element torque capacity is greater than the predetermined threshold value.

4. The servo system as claimed in claim 3, wherein:
the one clutch, which is engaged and disengaged by the outside piston, serves as a start frictional-engagement element engaged during a vehicle's starting period, and
the timing of operation of the inside piston for engagement, which is associated with the other clutch, is determined as a timing such that a first condition where a magnitude of input torque transmitted to the servo system is greater than or equal to a predetermined torque value and a second condition where a predetermined delay time has elapsed from a time when a command signal for application of the start frictional-engagement element is output are both satisfied.

5. The servo system as claimed in claim 4, wherein:
the servo system control device further comprises,
(b) a torque-down requirement command section through which an upper limit of the input torque transmitted from a driving power source to the servo system is limited to a desired torque value; and
(c) an engagement state detection section that detects an engagement state of the other clutch, which is engaged and disengaged by the inside piston, and
wherein the torque-down requirement command section limits the upper limit of the input torque by a first torque-down requirement command until a predetermined delay time elapses from a time when the other clutch has been engaged, and limits the upper limit of the input torque by a second torque-down requirement command less than the first torque-down requirement command after the predetermined delay time has elapsed from the time when the other clutch has been engaged.

6. The servo system as claimed in claim 5, wherein:
the servo system control device further comprises:
(d) an accelerator-pedal manipulated variable detection section that detects an accelerator pedal's manipulated variable, wherein a timing of disengagement of the other clutch, which is engaged and disengaged by the inside piston, is determined based on a time rate of change of the accelerator pedal's manipulated variable in an accelerator pedal release direction.

7. The servo system as claimed in claim 6, wherein:
the timing of disengagement of the other clutch, which is engaged and disengaged by the inside piston, is determined as a timing such that a first condition where the magnitude of the input torque transmitted to the servo system is less than or equal to a predetermined torque value and a second condition where a predetermined delay time has elapsed from a time when the magnitude of the input torque becomes less than or equal to the predetermined torque value are both satisfied.

8. A servo system employing at least two multiple disk clutches arranged in series to each other in an axial direction and at least two pistons used for engagement and disengagement of the respective clutches and arranged to be nested each other so that one of the pistons fits inside the other, comprising:
a servo system control device comprising,
(a) piston-stroke order control means for determining a timing of operation of each of the pistons for engagement of the respective clutches so that the pistons are operated in a specified order that the outside piston is operated prior to the inside piston.

9. A method of controlling a servo system employing at least two multiple disk clutches arranged in series to each other in an axial direction and at least two pistons used for engagement and disengagement of the respective clutches and arranged to be nested each other so that one of the pistons fits inside the other, one of the clutches associated with the outside piston and serving as a start frictional-engagement element, and the other clutch associated with the inside piston and serving as an engine braking means during a vehicle's coasting state, the method comprising:
determining whether a current operating mode is a neutral-to-drive range selection mode;
determining whether a first hydraulic pressure switch, which detects an apply pressure of a first clutch, becomes turned OFF during the neutral-to-drive range selection mode;
initiating application of the one clutch with a stroke of the outside piston in one axial direction from a time when the first hydraulic pressure switch becomes turned OFF during the neutral-to-drive range selection mode;
determining whether a magnitude of input torque transmitted to the servo system is greater than or equal to a predetermined torque value;
determining whether a predetermined delay time has elapsed from a point of time of the neutral-to-drive range selection, under a condition where the first hydraulic pressure switch becomes turned OFF during the neutral-to-drive range selection mode and additionally the magnitude of input torque is greater than or equal to the predetermined torque value, so as to determine a timing of initiation of a stroke of the inside piston in the one axial direction after the stroke of the outside piston in the one axial direction;
outputting a command signal for application of the other clutch with the stroke of the inside piston in the one axial direction and simultaneously outputting a first torque-down requirement command to limit an upper limit of the input torque, from a point of time when the predetermined delay time has elapsed from the point of time of the neutral-to-drive range selection;
determining whether a second hydraulic pressure switch, which detects an apply pressure of the other clutch, becomes turned ON, after outputs of the command signal for application of the other clutch with the stroke of the inside piston in the one axial direction and the first torque-down requirement command;
determining whether a predetermined delay time has elapsed from a time when the second hydraulic pressure switch becomes turned ON; and
switching a torque-down requirement command from the first torque-down requirement command to a second torque-down requirement command less than the first torque-down requirement command when the predetermined delay time has elapsed from the time when the second hydraulic pressure switch becomes turned ON.

10. The method as claimed in claim 9, further comprising:
determining whether a time rate of change of an accelerator pedal's manipulated variable in an accelerator pedal release direction is greater than or equal to a predetermined threshold value;
determining whether the magnitude of the input torque is less than or equal to a predetermined torque value;
determining whether a predetermined delay time has elapsed from a time when the magnitude of the input torque becomes less than or equal to the predetermined torque value;
switching the torque-down requirement command from the second torque-down requirement command to the first torque-down requirement command, when the time rate of change of the accelerator pedal's manipulated variable is greater than or equal to the predetermined threshold value;
switching the torque-down requirement command from the second torque-down requirement command to the first torque-down requirement command, when the magnitude of the input torque is less than or equal to the predetermined torque value and the predetermined delay time has elapsed from the time when the magnitude of the input torque becomes less than or equal to the predetermined torque value; and
outputting a command signal for release of the other clutch with the stroke of the inside piston in the opposite axial direction, from a point of time when the predetermined delay time has elapsed from the time when the magnitude of the input torque becomes less than or equal to the predetermined torque value.

11. A method of controlling a servo system employing at least two multiple disk clutches arranged in series to each other in an axial direction and at least two pistons used for engagement and disengagement of the respective clutches and arranged to be nested each other so that one of the pistons fits inside the other, one of the clutches associated with the outside piston and serving as a start frictional-engagement element, and the other clutch associated with the inside piston and serving as an engine braking means during a vehicle's coasting state, the method comprising:
determining whether a drive range is selected;
determining whether a first hydraulic pressure switch, which detects an apply pressure of a first clutch, becomes turned OFF in the drive range;
initiating application of the one clutch with a stroke of the outside piston in one axial direction from a time when the first hydraulic pressure switch becomes turned OFF in the drive range;
determining whether a magnitude of input torque transmitted to the servo system is greater than or equal to a predetermined torque value;

determining whether a predetermined delay time has elapsed from a time when the magnitude of the input torque transmitted to the servo system becomes greater than or equal to the predetermined torque value, under a condition where the first hydraulic pressure switch becomes turned OFF in the drive range, so as to determine a timing of initiation of a stroke of the inside piston in the one axial direction after the stroke of the outside piston in the one axial direction;

outputting a command signal for application of the other clutch with the stroke of the inside piston in the one axial direction and outputting a first torque-down requirement command suited for a first gear range stall period to limit an upper limit of the input torque, from a point of time when the predetermined delay time has elapsed from the time when the magnitude of the input torque becomes greater than or equal to the predetermined torque value;

determining whether a second hydraulic pressure switch, which detects an apply pressure of the other clutch, becomes turned ON, after outputs of the command signal for application of the other clutch with the stroke of the inside piston in the one axial direction and the first torque-down requirement command;

determining whether a predetermined delay time has elapsed from a time when the second hydraulic pressure switch becomes turned ON; and switching a torque-down requirement command from the first torque-down requirement command to a second torque-down requirement command less than the first torque-down requirement command when the predetermined delay time has elapsed from the time when the second hydraulic pressure switch becomes turned ON.

* * * * *